US008698607B2

(12) United States Patent
Van De Sluis et al.

(10) Patent No.: US 8,698,607 B2
(45) Date of Patent: Apr. 15, 2014

(54) LIGHTING SYSTEM AND REMOTE CONTROL METHOD THEREFOR

(75) Inventors: Bartel Marinus Van De Sluis, Eindhoven (NL); Lorenzo Feri, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 612 days.

(21) Appl. No.: 12/746,197

(22) PCT Filed: Dec. 1, 2008

(86) PCT No.: PCT/IB2008/055025

§ 371 (c)(1), (2), (4) Date: Jun. 4, 2010

(87) PCT Pub. No.: WO2009/072053

PCT Pub. Date: Jun. 11, 2009

(65) Prior Publication Data

US 2010/0244746 A1 Sep. 30, 2010

(30) Foreign Application Priority Data

Dec. 4, 2007 (EP) .................................... 07122247

(51) Int. Cl.
*G05B 11/01* (2006.01)
*G08C 19/16* (2006.01)

(52) U.S. Cl.
USPC ........ 340/12.22; 340/953; 340/954; 340/955; 340/956; 362/276; 362/227; 362/249.02; 362/85; 362/147; 362/148; 398/172

(58) Field of Classification Search
USPC ........................................................ 340/12.22
See application file for complete search history.

(56) References Cited

U.S. PATENT DOCUMENTS

2002/0074958 A1* 6/2002 Crenshaw ............ 315/DIG. 005
2006/0049935 A1* 3/2006 Giannopoulos et al. ...... 340/533

FOREIGN PATENT DOCUMENTS

| | | | |
|---|---|---|---|
| WO | 0213490 | A2 | 2/2002 |
| WO | 2004057927 | A1 | 7/2004 |
| WO | 2006111927 | A1 | 10/2006 |
| WO | 2006111934 | A1 | 10/2006 |

* cited by examiner

*Primary Examiner* — George Bugg
*Assistant Examiner* — Anthony D Afrifa-Kyei
(74) *Attorney, Agent, or Firm* — John Salazar; Mark Beloborodov

(57) ABSTRACT

Proposedis a remote control device (100), arranged to control a lighting system(1). The lighting system comprises a plurality of light-modules (10) capable of emitting modulated light comprising light module identification codes (20). The remote controldevice (100) comprises a sensor (110) arranged to switch the light modules (10) from an operational mode (210) in which the light emitted by the light modules (10) is non-5 modulated to a control mode (230) in which the light emitted by the light modules (10) is modulated. Advantageously, the invention provides a lighting system with improved energy efficiency and EMC characteristics.

8 Claims, 1 Drawing Sheet

LIGHTING SYSTEM AND REMOTE CONTROL METHOD THEREFOR

FIELD OF THE INVENTION

The invention relates to a remote control device arranged to control a lighting system comprising a plurality of light modules capable of emitting modulated light comprising light module identification codes. Furthermore, the invention relates to a lighting system comprising a plurality of light modules arranged to emit modulated light comprising light module identification codes. Moreover, the invention relates to a method to control such a lighting system, the method comprising the steps (i) providing a remote control device, and (ii) checking whether the remote control device is operated by a user. Intuitive controlling a lighting effect in a desired location suitably makes use of such remote control devices, lighting systems and control methods.

BACKGROUND OF THE INVENTION

An embodiment of a remote control device of the kind set forth is known from WO2006/111927, assigned to the same applicant. That document discloses a control method of an advanced lighting system. The system comprises at least one lighting arrangement, such as luminaries, downlight, uplight, wallflushers, etc. The lighting arrangements emit modulated light, comprising identification codes identifying the lighting arrangement. The system furthermore comprises a remote control device suitable to receive the light from the lighting arrangements and derive the identification codes there from. The derived codes enable the control device to determine which lighting arrangements contribute to the illumination at the position of the device, as well as to locate its position relative to the lighting arrangements from which it receives light. Moreover, the control device may derive additional data from the light received, such as colour point, light intensity, etc. Subsequently, the user control device may transmit the codes, location, and—in general—lighting related data (including user defined commands) to a master controller of the lighting system. Receiving the data from the user control device enables the master control to control the lighting arrangements in the system in accordance with the received data (i.e. adjustment of the lighting conditions such as for instance a change in colour point, light intensity, beam shape, etc)., The advantage of this approach lies in the fact that it allows the user an intuitive control of the lighting effects creatable with the system. This becomes especially comfortable for a lighting system comprising many tens or hundreds of luminaries.

However, a drawback of the solution described in WO2006/111927 is that all lighting arrangements need to transmit identification codes at all times, in order to make them visible to the remote control device. It will be readily appreciated that luminaries turned ‘off’ do not emit light and hence no identification codes can be detected. Of course the lighting arrangements may be ‘on’ at high dimming levels, i.e. at low light intensity levels. Still, even at such dimmed levels, WO2006/111927 discloses an energy inefficient method and system. Continuous modulation of the light (at high frequencies, typically megahertz) to incorporate the identification codes forms a further drawback, as it contributes to electromagnetic emissions and EMC issues. In addition, appreciating that certain desired lighting effects prescribe one or more luminaries to be turned ‘off’, the necessity to have these luminaries emit light (even at low intensities) contributes to undesired light distributions.

SUMMARY OF THE INVENTION

It is an objective of the invention to provide a lighting system, control method, and remote control device of the kind set forth with improved energy efficiency. It is a further objective to provide a lighting system and control method having improved EMC characteristics. Moreover, it is an objective of the invention to provide a lighting system and a control method that avoid non requested light distribution when user control is not desired. At least one of these objects is achieved with the remote control device according to the invention as defined in claim 1, the lighting system as defined in claim 6, and the control method as defined in claim 11.

According to a first aspect the invention provides a remote control device, arranged to control a lighting system comprising a plurality of light modules capable of emitting modulated light comprising light module identification codes, CHARACTERIZED IN THAT the remote control device comprises a sensor arranged to switch the light modules in the lighting system from an operational mode in which the light emitted by the light modules is non-modulated to a control mode in which the light emitted by the light modules is modulated.

The invention is based on the insight that many lighting application only need to control/adjust the desired lighting effect during a minor part of the time. Advantageously, the invention allows saving energy and reducing electromagnetic emissions by discontinuing modulating the light modules in the operational mode. Moreover, it avoids undesired light distributions. Only an adjustment of the lighting effect necessitates the system to be switched to the control mode. Hence, in the operational mode all light modules that need not contribute to the desired light effect can be turned ‘off’, while the light modules that contribute to the lighting effect need not be modulated to comprise identification codes. Conversely, in the control mode all light modules are turned on and emit modulated light comprising identification codes to allow adjustment and control of the lighting effect.

In an embodiment of the present invention the sensor is arranged to be user operable. Advantageously, this allows the user to determine when to switch the lighting system from operational mode to control mode. Thus, the user may activate the switchover by for instance explicitly pressing a button on a user interface (UI) on the remote control device.

According to an embodiment of the invention the sensor switches light modules from the operational mode to the control mode in response to automatic detection of a user operating the remote control device. Advantageously, this allows for a very intuitive switchover to the control mode, as the switchover is automatically made as soon as the user operates the remote control device. Picking-up the device, holding the device, moving the device, and entering commands via the UI constitute examples of operating the device.

In an embodiment of the remote control device according to the invention the sensor is chosen from the group consisting of push, touch, conductivity, motion, and acceleration sensors. Advantageously, such sensors allow automatic detection of a user operating the remote control device.

In an embodiment of the invention the remote control device further comprising a light detector, arranged to detect light emitted by the light modules and to derive the identification codes from the light detected, control data generation means, arranged to generate control data intended for the lighting system based on the light detected and the identification codes derived, and communication means, arranged to communicate the control data to a master controller of the lighting system. Advantageously, this allows adjustment of the desired lighting effect with the system in control mode.

According to a second aspect, the invention provides a lighting system comprising a plurality of light modules capable of emitting modulated light comprising light module identification codes, CHARACTERIZED IN THAT the light modules in the lighting system are arranged to be switchable between an operational mode, in which the light emitted by the light modules is non-modulated, and a control mode, in which the light emitted by the light modules is modulated.

In an embodiment, the lighting system further comprises a remote control device arranged to switch the light modules from the operational mode to the control mode. Advantageously, this allows a user to determine when to switch the lighting system from operational mode to control mode.

In an embodiment, the plurality of light modules are arranged in a first group and a second group, and the remote control device is arranged to only switch the light modules comprised in the first group from the operational mode to the control mode. Advantageously, as often only the light effect created by a sub-group of all the light modules in the system needs adjustment, only those light modules need a switchover to the control mode.

In an embodiment of the system, the remote control device is further arranged to communicate control data intended for the lighting system, and the system further comprises a master controller arranged to control the plurality of light modules in accordance with the control data received from the remote control device. Advantageously, this allows realising the light effect adjustment in a very intuitive way.

In an embodiment, the light modules are arranged to be switched back to the operational mode after a predetermined time interval following a switch to the control mode. Advantageously, this avoids erroneous adjustment of the light effect, such as for instance during (short) moments when the sensor can not accurately determine whether the remote control unit is being operated. Moreover, this allows for the operational mode to be the default mode of the system and hence realises an improved energy efficiency of the system.

According to a third aspect, the invention provides a method to control a lighting system comprising a plurality of light modules capable of emitting modulated light comprising light module identification codes, the method comprising the steps providing a remote control device, CHARACTERIZED BY the steps checking whether the remote control device is operated by a user, and accordingly switching light modules from an operational mode, in which the light emitted by the light modules is non-modulated, to a control mode, in which the light emitted by the light modules is modulated, if the remote control device is operated.

In an embodiment, the method further comprises the step defining a first group and a second group of light modules, and switching only the light modules in the first group from the operational mode to the control mode.

In an embodiment, the method further comprises the step controlling all light modules in the first group to emit light.

In an embodiment, the method further comprises the steps (i) detecting light emitted by the light modules in the first group and derive the identification codes from the light detected, (ii) generating control data based on the light detected and the identification codes derived, (iii) communicating the control data to a master controller of the lighting system, and (iv) controlling the light modules in the first group using the master controller in accordance with the control data received.

In an embodiment, the method further comprises the step switching the light modules in the first group from the control mode back to the operational mode after a predetermined time interval.

These and other aspects of the invention will be apparent from and elucidated with reference to the embodiments described hereinafter.

BRIEF DESCRIPTION OF THE DRAWINGS

Further details, features and advantages of the invention are disclosed in the following description of exemplary and preferred embodiments in connection with the drawings.

DETAILED DESCRIPTION OF THE EMBODIMENTS

Figure 1:
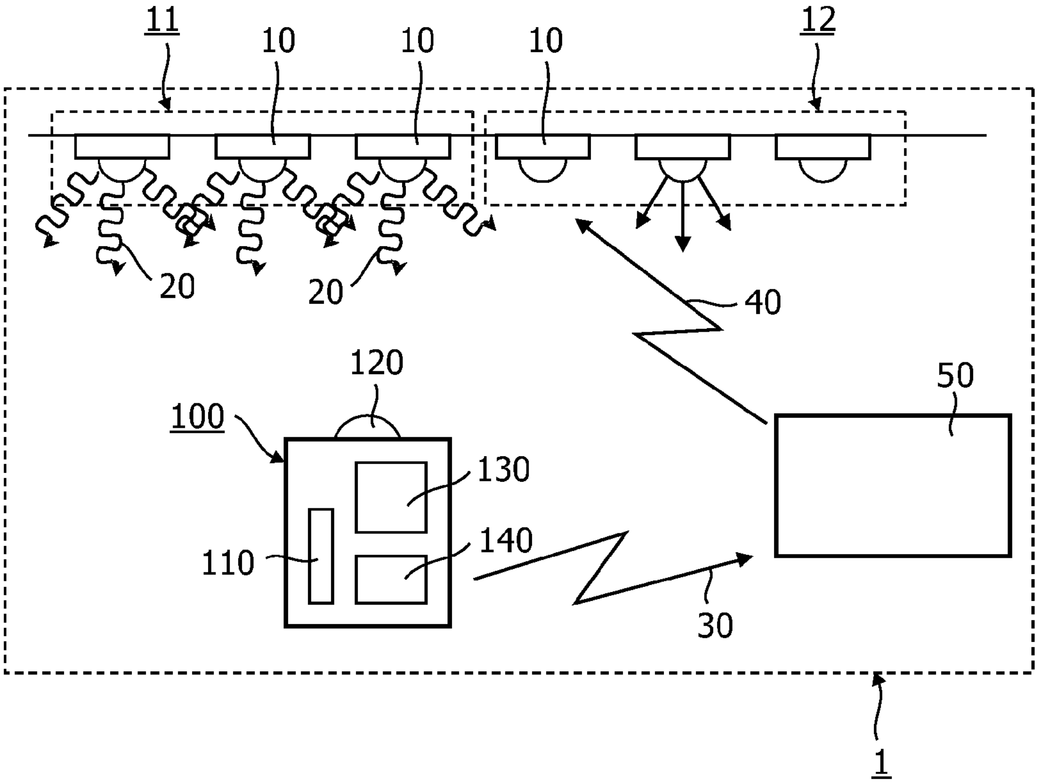
FIG. 1 shows a lighting system according to the invention

FIG. 1 shows a lighting system 1 of the kind set forth. The system comprises a plurality of light modules 10. These modules may comprise one or more light sources, such as LEDs, oLEDs, fluorescent tubes, HID bulbs, etc. The light modules 10 comprise a modulator capable of modulating the light emitted to comprise light module identification codes 20. The lighting system 1 further comprises a remote control device 100, capable of detecting the light emitted by the light modules 10 with a light detector 120 and deriving amongst others the identification codes 20 from the light detected. The remote control device 100 further comprises control data generation means 130, arranged to generate control data intended for the lighting system 1 based on the light detected and the identification codes 20 derived. The control data may comprise the identification codes, data relating to a property of the light detected (such as colour point, intensity, etc) and user defined commands. Preferably the remote control device comprises a user interface (UI—not shown) allowing a user to define a command. The remote control device 100 moreover comprises communication means 140, arranged to communicate the control data to a master controller 50 of the lighting system 1 via a communication link 30. The communication link 30 preferably is a wireless link (such as based on Bluetooth, zigbee, RF, etc), but may in principle be a wired link or any other appropriate link known in the art. Finally, the master controller 50 is arranged to control the light modules 10 in accordance with the control data received from the remote control device 100 via a control link 40. Again, this link may be wireless, wired, or any other appropriate link known in the art.

The lighting system 1 thus establishes a closed loop between the light modules 10, the remote control device 100 and the master controller 50. Advantageously, this allows the user intuitive control of the lighting effect at or near the location of the remote control device. For example, the colour point of the illumination at the location of the remote control device 100 may be stabilized. This is especially beneficial when LEDs are applied as light sources since their emission wavelength is known to be sensitive to for instance temperature changes. The system 1 also allows a user to 'copy/paste' a lighting effect in one location to another or to have the system illuminate the remote control device 100 with a constant illumination even when the device is repositioned by the user, resulting in a 'follow me' light effect. Applying this technology allows the creation of many other (dynamic) light effects—limited by the imagination of the user only.

All these intuitive control possibilities rely on the presence of the identification codes 20 in the light emitted by the light modules 10. These codes however obviously only are present when the light modules are 'on' and therefore emit light. The invention is based on the insight that many lighting application only need to control/adjust the desired lighting effect during a minor part of the time. Most of the time the lighting effects remain constant once installed or programmed into the lighting system 1. Note that this not necessarily excludes dynamic light effects.

Figure 2:
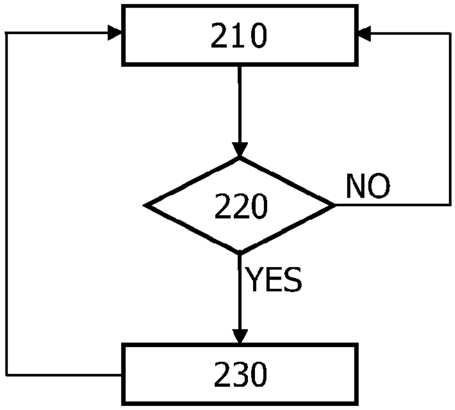
FIG. 2 shows a method according to the invention

The invention therefore provides a control mode 230 (FIG. 2) of the light modules 10, where all the modules in the lighting system are 'on' and the light emitted is modulated to comprise identification codes 20. Moreover, the invention also provides an operational mode 210, in which the light emitted by the light modules 10 is non-modulated. Advantageously, the invention allows saving energy and reducing electromagnetic emissions by discontinuing modulating the light modules 10 in the operational mode 210. Only an adjustment of the lighting effect necessitates the lighting system 1 to be switched to the control mode 230. Hence, in the operational mode all light modules 10 that need not contribute to the desired light effect can be turned 'off', while the light modules that contribute to the lighting effect need not be modulated. Conversely, in the control mode 230 all light modules are turned on and emit modulated light comprising identification 20 codes to allow adjustment and control of the lighting effect.

The invention further provides the remote control device 100 to comprise a sensor 110 arranged to switch light modules 10 from the operational mode 210 to the control mode 230. Preferably, the sensor 110 is able to detect a user initiating usage of or interaction with the remote control device 100 and upon detecting this induces a switch of modes. Preferably, the sensor 110 is arranged to be user operatable. After obtaining the insight that the lighting system 1 only needs to be controlled during a minor part of the time for adjusting the light effect, it will also become clear that a user operates the remote control device 100 only during that control period by for instance picking the device up and moving it about.

The user might explicitly operate the sensor by for instance pushing a button on the UI. Alternatively, the sensor 110 may automatically detect the user to operate the remote control device 100. For instance, providing the sensor as a touch, conductivity, motion or acceleration sensor, allows determining whether a user picks up the remote control device. Preferably, the sensor 110 automatically switches the light modules 10 from the operational mode 210 to the control mode 230 after determining that the user has picked up, touched or moved (in other words: operated) the remote control device 100. This switching of the light modules 10 may be done directly or via the master controller 50.

Preferably, arranging the remote control device 100 to comprise a light detector 120 allows it to detect the light emitted by the light modules 10 in the control mode 230 and to derive the identification codes 20. Further arranging the remote control device 100 to comprise control data generation means 130 allows for generating control data intended for the lighting system 1. These control data may comprise the identification codes 20, data relating to a property of the light detected (such as colour point, intensity, etc) and user defined commands. Incorporating communication means 140 into the remote control device 100 arranged to communicate the control data to a master controller 50 of the lighting system 1 advantageously allows adjustment of the desired lighting effect with the lighting system 1 in control mode 230.

Thus, the invention allows a method to control a lighting system 1 by checking 220 whether the remote control device 100 is operated by a user and (after a positive outcome) accordingly switching light modules 10 from the operational mode 210 to the control mode 230. Preferably only a limited amount of light modules 10 need switching over to the control mode 230, as only these modules contribute to a light effect in a predetermined location. For instance, when adjusting the light effect in a conference room of an office building only the light modules 10 present in that room need to switch over to the control mode 230, while light modules in corridors, lobby, offices, etc, may remain in the operational mode 210. Thus, the method further comprises the steps defining a first group 11 and a second group 12 of light modules 10 and switching only the light modules in the first group from the operational mode 210 to the control mode 230. Preferably, the method further comprises the step controlling all light modules 10 in the first group 11 to emit light (i.e. modulated light comprising the identification codes 20), as this allows to determine and adjust the contributions of the light modules to the desired light effect.

Preferably, the master controller 50 controls the lighting system 1 and its light modules 10 by default in the operational mode 210. Advantageously, this allows for the maximum achievable energy efficiency and other benefits of the invention. Thus, preferably the light system 1 returns to the operational mode 210 after controlling the system and adjusting the light effect has finished. Arranging for a very intuitive control, the lighting system 1 and light modules 10 switch back to the operational mode 210 after a predetermined time interval. This time interval could be start following a switch to the control mode 230. Alternatively, it could start when the sensor 110 ceases to detect user action (including movement, holding the remote control device etc). Preferably, the predetermined time interval has been set on the one hand to comfortably allow a user to control and adjust the light effects while on the other hand to avoid erroneous adjustments of the light effect. These later adjustments could happen for instance during short moments when the sensor 110 can not accurately determine whether the remote control device 100 is being operated.

Although the invention has been elucidated with reference to the embodiments described above, it will be evident that alternative embodiments may be used to achieve the same objective. The scope of the invention is therefore not limited to the embodiments described above. Accordingly, the spirit and scope of the invention is to be limited only by the claims and their equivalents.

The invention claimed is:

1. A lighting system, comprising:

a plurality of light modules operable in a plurality of modes for emitting either modulated light including light module identification codes or non-modulated light, the light modules being switchable between an operational mode in which the light emitted by the light modules is non-modulated and a control mode in which the light emitted by the light modules is modulated;

a remote control device having a sensor for automatically detecting user operation, the remote control operable upon detection of the user operation for automatically switching at least one of the plurality of light modules between the operational mode and the control mode;

wherein the light modules are configured to automatically switch from the control mode to the operational mode after a predetermined time interval.

2. A lighting system according to claim 1, further comprising a master controller for controlling the plurality of lighting modules based on control data, wherein the remote control device is configured to communicate the control data to the master controller.

3. A method to control a lighting system comprising a plurality of light modules capable of emitting either modulated light comprising light modulated identification codes or non-modulated light, the method comprising the steps of:

providing a remote control device, detecting by a sensor on the remote control device whether the remote control device is being operated by a user, and, if so, automatically sending a command from the remote control device which is operable to automatically switch the light modules from an operational mode , in which the light emitted by the light modules is non-modulated, to a control mode , in which the light emitted by the light modules is modulated, defining a first group and a second group of light modules, switching only the light modules in the first group from the operational mode to the control mode.

4. A method to control a lighting system according to claim 3, further comprising the step controlling all light modules in the first group to emit light.

5. A method to control a lighting system according to claim 4, further comprising the steps:

detecting light emitted by the light modules in the first group and derive the identification codes from the light detected, generating control data based on the light detected and the identification codes derived, communicating the control data to a master controller of the lighting system, and controlling the light modules in the first group using the master controller in accordance with the control data received.

6. A method to control a lighting system according to claim 5, further comprising the step switching the light modules in the first group from the control mode back to the operational mode after a predetermined time interval.

7. A lighting system according to claim 1, wherein the remote control device comprises a light detector configured to detect light emitted by the light modules and to derive the light module identification codes from the detected light, and wherein the control data is based at least in part on the derived identification codes.

8. The lighting system according to claim 1, wherein the sensor of the remote control device is selected from the group consisting of: push, touch, conductivity, motion, and acceleration sensors.

* * * * *